United States Patent [19]

Zucker et al.

[11] Patent Number: 4,502,364

[45] Date of Patent: Mar. 5, 1985

[54] COMPOSITE FIBROUS PACKING MATERIAL CONTAINING FIBERS OF AROMATIC SULFIDE POLYMERS

[75] Inventors: Jerry Zucker, Charleston; John W. Hawkins, Ahan; John J. O'Brien, Mt. Pleasant, all of S.C.

[73] Assignee: RM Industrial Products Company, Inc., North Charleston, S.C.

[21] Appl. No.: 534,674

[22] Filed: Sep. 22, 1983

[51] Int. Cl.³ .................... D04C 1/00; D02G 3/02; D02G 3/00; B32B 27/00

[52] U.S. Cl. .................................. 87/8; 57/229; 428/373; 428/374; 428/392; 428/394; 227/125

[58] Field of Search .............. 428/373, 374, 392, 394; 87/8; 27/229; 277/125, DIG. 6

[56] References Cited

U.S. PATENT DOCUMENTS

| | | | |
|---|---|---|---|
| 2,337,986 | 12/1943 | Fry | 87/8 |
| 2,398,210 | 4/1946 | Cumming et al. | 87/8 |
| 3,534,652 | 10/1970 | Zumeta et al. | 57/229 |
| 3,771,305 | 11/1973 | Barnett | 87/8 |

Primary Examiner—George F. Lesmes
Assistant Examiner—Beverly K. Johnson
Attorney, Agent, or Firm—Gary, Juettner & Pyle

[57] ABSTRACT

A packing material of braided yarns is provided wherein the yarns have a glass and/or acrylic core and an outer layer of polyphenylene sulfide fibers, either alone or in combination with other unreactive fibers such as aramid, carbon or graphite fibers.

3 Claims, No Drawings

COMPOSITE FIBROUS PACKING MATERIAL CONTAINING FIBERS OF AROMATIC SULFIDE POLYMERS

BACKGROUND OF THE INVENTION

This invention relates to packing or seals and more particularly to a composite packing or seal fabricated from a particular blend of fibers including polyphenylene sulfide fibers.

Methods for preparing polyphenylene sulfide fibers are described in U.S. Pat. Nos. 3,898,204 and 3,912,695. Such fibers have several desirable properties including high strength, high melting point and non-burning characteristics. The fibers are also relatively unreactive with many corrosive materials including commonly used acids and bases.

Materials containing polyphenylene sulfide have heretofore been proposed as a packing or gasket material. U.S. Pat. No. 4,056,594 describes the extrusion of a solid rod containing solid polyphenylene sulfide and polytetrafluoroethylene, together with optional fillers, such as glass, asbestos, carbon, and the like. Similarly, U.S. Pat. No. 4,050,701 discloses the formation of a seal containing a mixture of polyphenylene sulfide and polytetrafluoroethylene. These materials, however, are relatively expensive to produce and require the use of relatively high proportions of costly materials.

SUMMARY OF THE INVENTION

In accordance with the present invention, a seal or packing is made up from a plurality of fibrous yarns containing an outer layer of polyphenylene sulfide. The yarns are preferably a composite having a central core of a relatively inexpensive material such as glass and/or acrylic fibers. The outer layer of the yarn may be either polyphenylene sulfide alone or polyphenylene sulfide in combination with other relatively inert fibers such as aramid, carbon and/or graphite fibers, which are intimately blended with the polyphenylene sulfide fibers. The outer layer of the yarns, which are exposed to the environment experienced by the packing, serves to protect the core, while the core augments the tensile strength of the yarns. Thus, a relatively inexpensive packing material may be provided that exhibits comparable or even better properties than a similar seal composed of polyphenylene sulfide alone.

DESCRIPTION OF THE PREFERRED EMBODIMENT

The packing of the present invention is composed of a plurality of braided yarns, at least some, and preferably a majority, of which are composite yarns each having an inner and outer layer and containing a minimum of about 15 percent fibrous polyphenylene sulfide. Such yarns are prepared by a conventional spinning process, preferably a DREF process, wherein an outer layer of yarns is twisted around a central core.

In accordance with the present invention, relatively inexpensive, high tensile strength yarns are used to provide the core of the composite yarn. The core may comprise, for example, glass or acrylic fibers or mixtures thereof, with or without polyphenylene sulfide fibers. The core may comprise from about 10 to about 60 percent by weight of the composite yarns.

The outer layer contains polyphenylene sulfide fibers either alone or blended in intimate combination with relatively inert fibers, such as aramid, carbon, graphite, polytetrafluoroethylene or mixtures thereof.

A plurality of resulting yarns are braided together in a conventional fashion to produce an elongated braided body of desired cross section, such as, for example, rectangular or round. Either prior to or after the braiding step, a silicone lubricant may be incorporated into the yarn. In the alternative, fibers of polytetrafluoroethylene may be incorporated into the outer layer of fibers to provide lubricity. As an alternative to braiding, the yarns may be combined in other fashions, such as twisting.

The resulting packing or seal exhibits excellent chemical resistance, has a low coefficient of friction against other surfaces, and is stable at temperatures up to 300 degrees F.

We claim:

1. A packing comprising a plurality of braided yarns, said yarns comprising an inner core and an outer layer protecting the inner core, said core comprising fibers selected from the group consisting of fibers of glass, acrylic and mixtures thereof, said outer layer comprising polyphenylene sulfide, wherein the amount of polyphenylene sulfide in said packing is at least 15 percent by weight and wherein the core comprises from about 10 to about 60 percent by weight of the yarns.

2. The packing according to claim 1 wherein said outer layer comprises polyphenylene sulfide fibers blended in intimate combination with carbon fibers.

3. The packing according to claim 1 wherein said outer layer comprises polyphenylene sulfide fibers blended in intimate combination with aramid fibers.

* * * * *